May 30, 1961 G. J. KASSELMANN 2,986,055
CONTOUR CHASING LATHE AND METHOD OF OPERATION
Filed March 28, 1958 7 Sheets-Sheet 1

INVENTOR
GEORGE J. KASSELMANN
BY Toulmin & Toulmin
ATTORNEYS

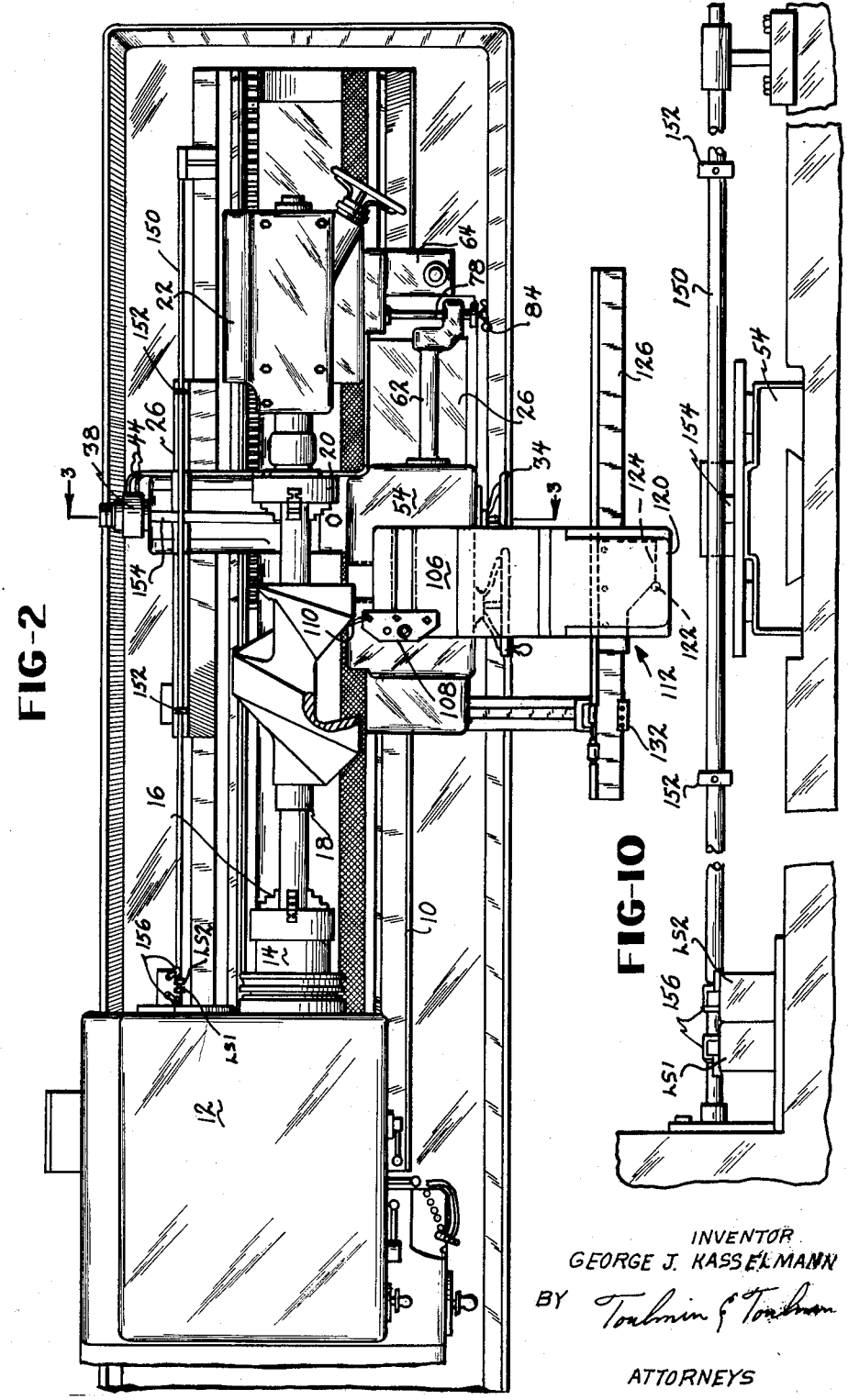

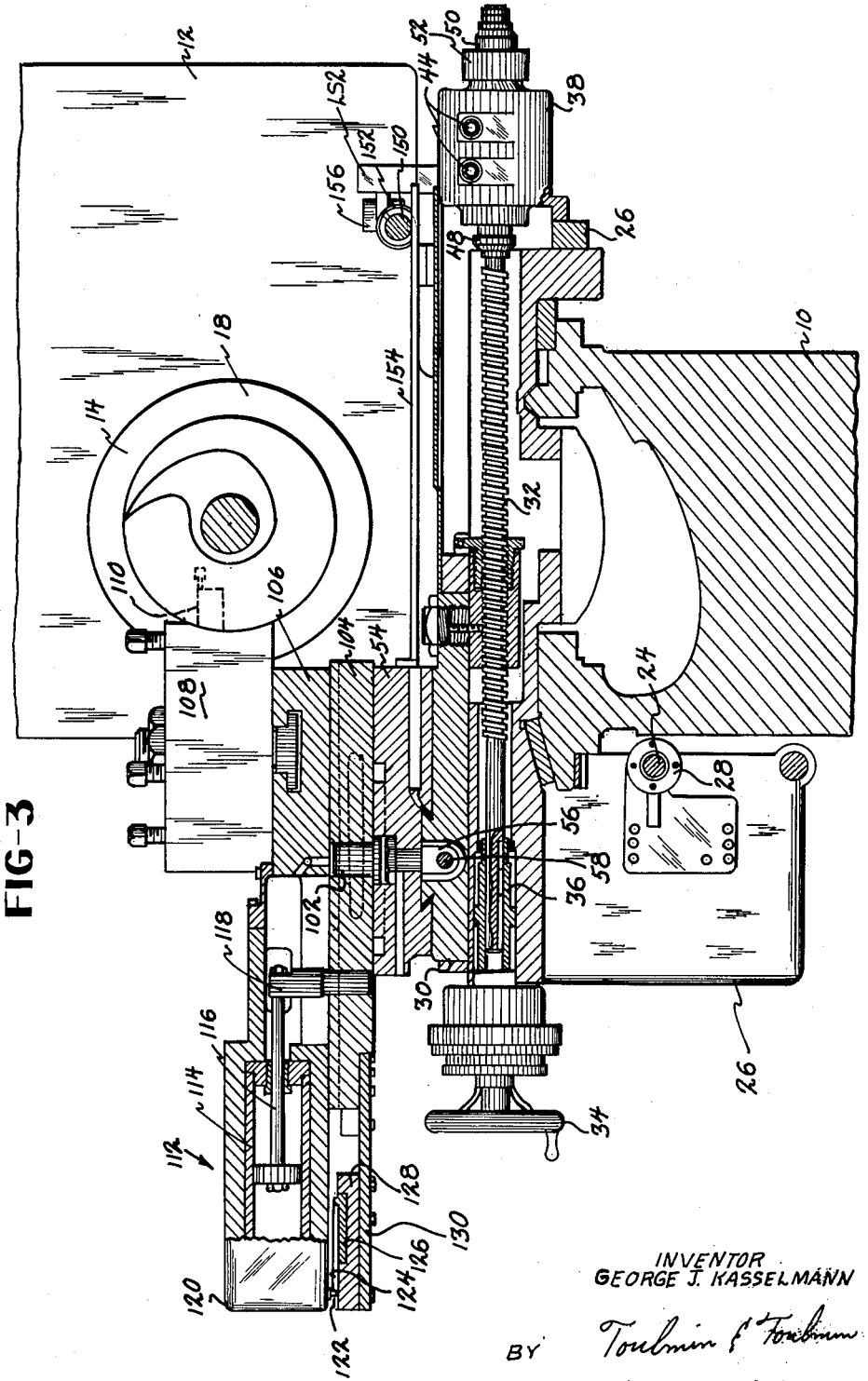

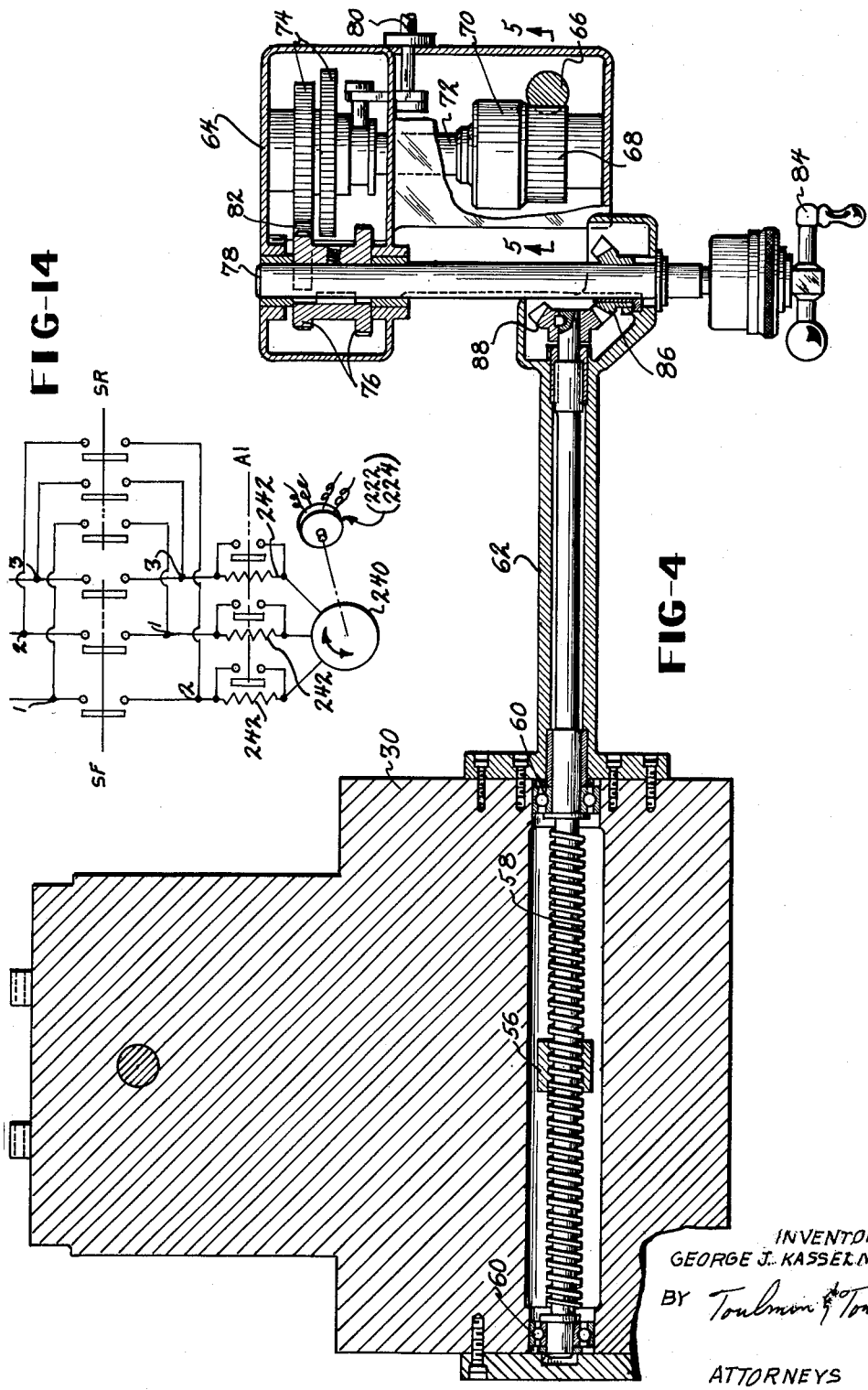

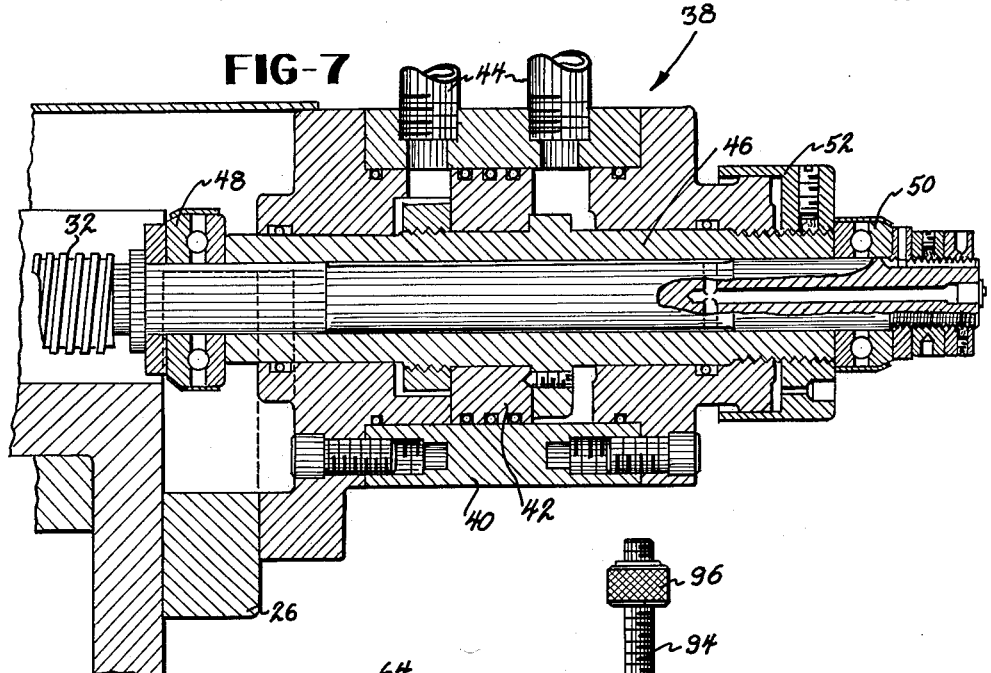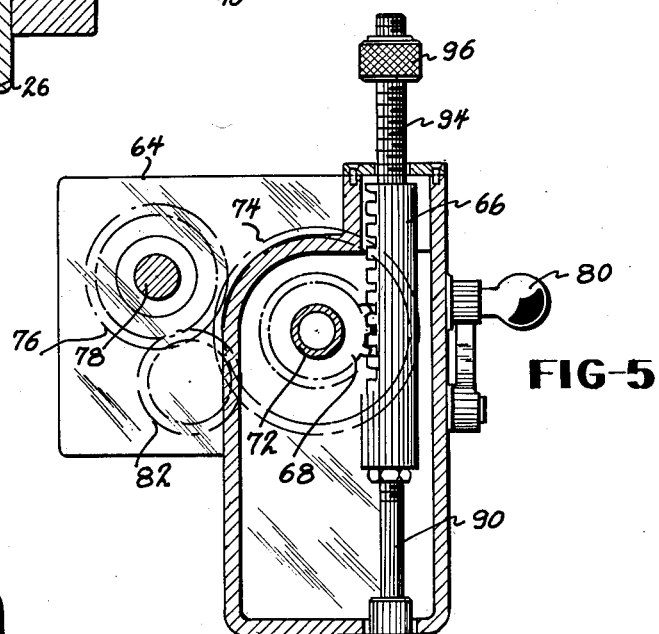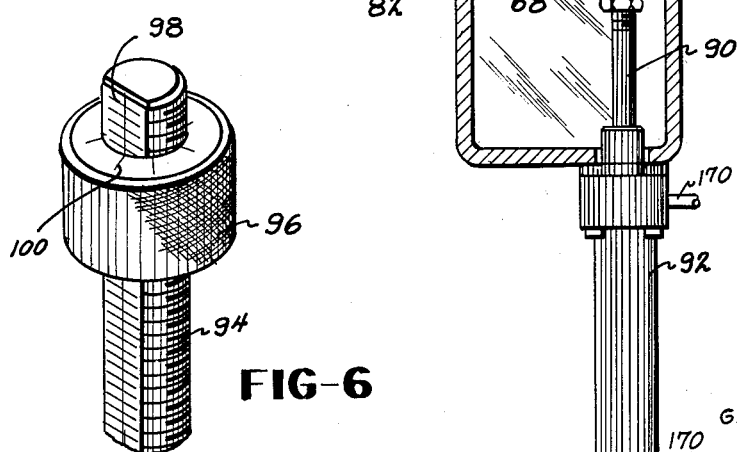

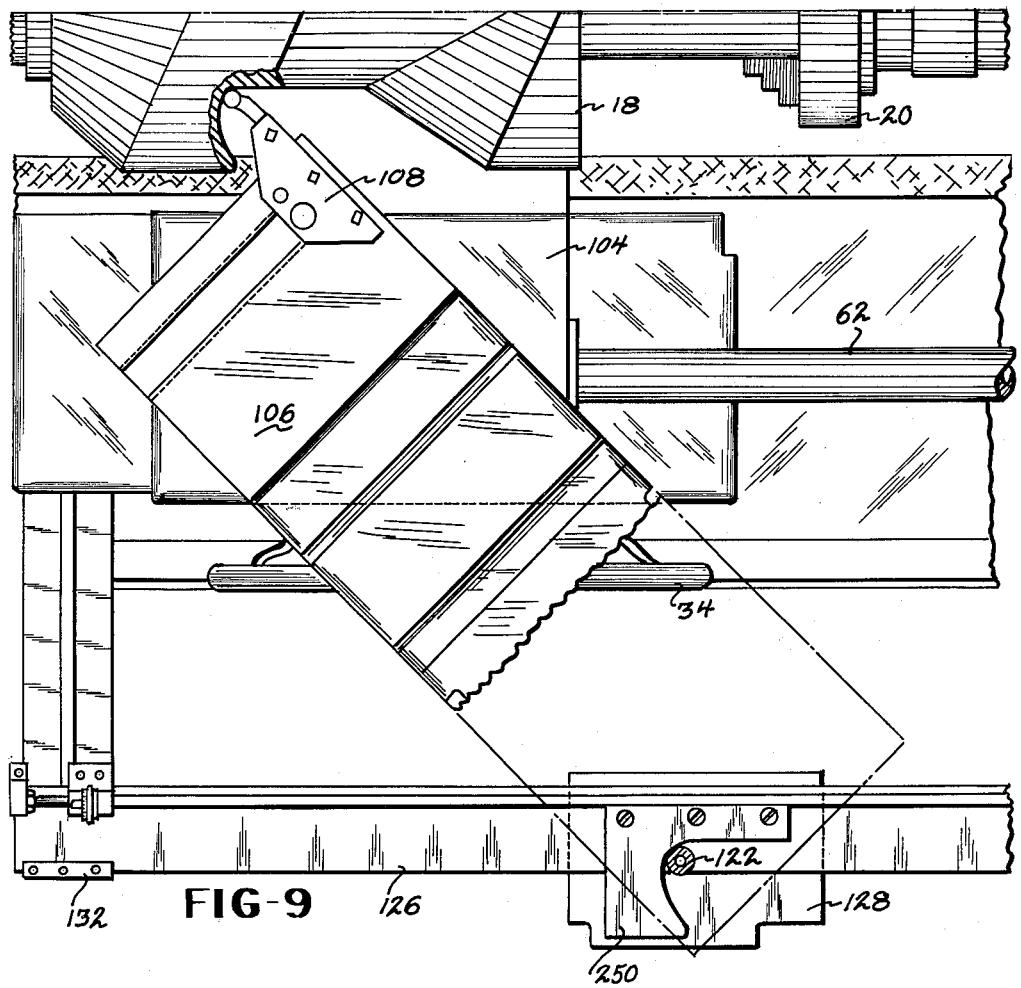
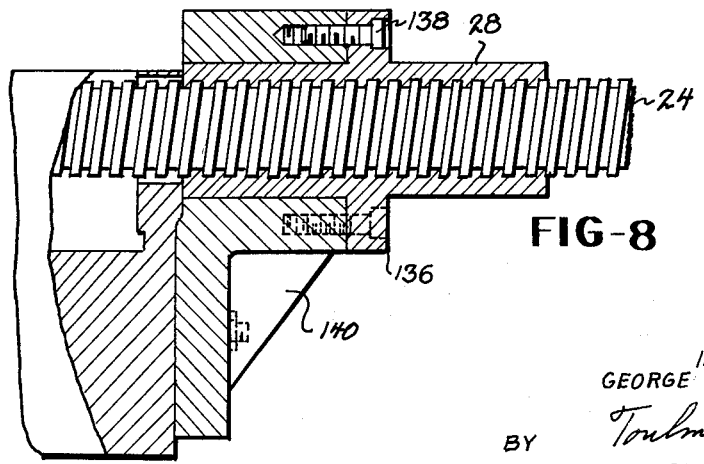

May 30, 1961 G. J. KASSELMANN 2,986,055
CONTOUR CHASING LATHE AND METHOD OF OPERATION
Filed March 28, 1958 7 Sheets-Sheet 7
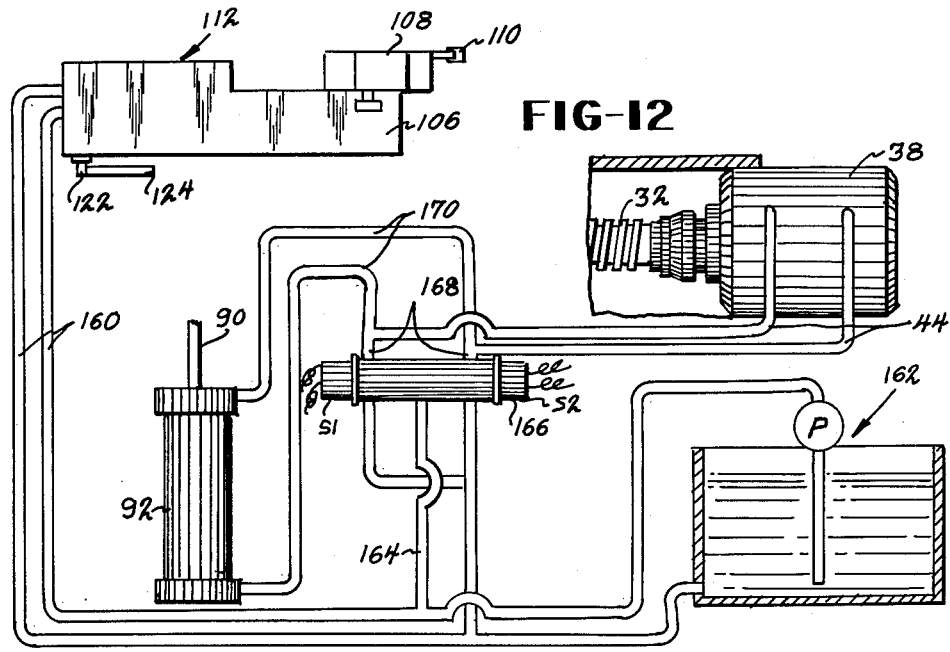
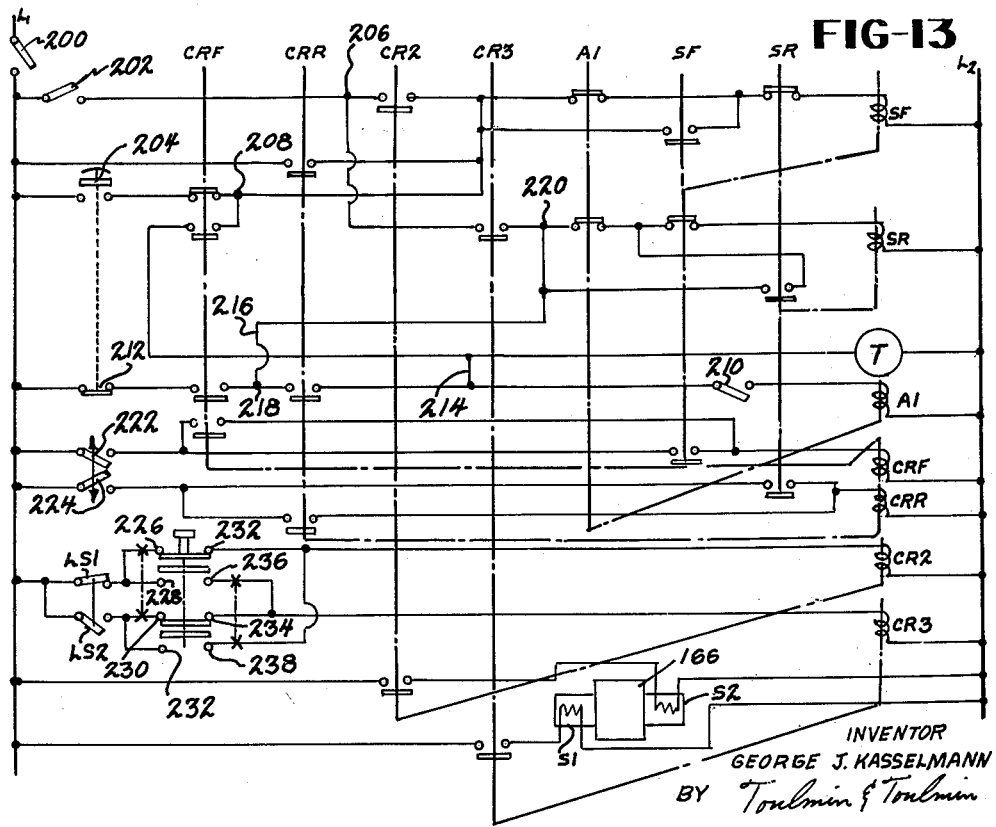
INVENTOR
GEORGE J. KASSELMANN
BY Toulmin & Toulmin
ATTORNEYS United States Patent Office 2,986,055
Patented May 30, 1961

2,986,055
CONTOUR CHASING LATHE AND METHOD OF OPERATION

George J. Kasselmann, Cincinnati, Ohio, assignor to The R. K. Le Blond Machine Tool Co., Cincinnati, Ohio Filed Mar. 28, 1958, Ser. No. 724,601

10 Claims. (Cl. 82—14)

This invention relates to machine tools and in particular relates to machine tools for turning contours under the control of a template or pattern, and to a novel method of reproducing contours from a template.

In the usual type of template controlled machine tool there is provided a template or pattern which is traversed by a follower with a mechanism being connected with the follower in the form of a servomotor to maintain the follower in a predetermined relationship with the template or pattern.

Also connected with the servomotor is a cutting tool so that the cutting tool follows the same path as the follower and when such a cutting tool is brought into cutting relation with a work member the work member will be formed so as to have the same shape as the pattern or to have the same cross-sectional configuration as the template.

Such template controlled machine tools have heretofore been limited in the main to the production of work members which are circular in cross-section or which are relatively simple in cross-section such as a propeller blade. The rapid machining, particularly turning, or other configurations has heretofore not been possible with such machines and especially the turning of spiraling work members or work members having a spiral configuration on the surface thereof and including such work members where the configuration is of a re-entrant nature with respect to a transverse line through the work member. It is particularly in connection with the turning of such work members that the present invention is concerned.

In the usual operation of a template or pattern controlled machine, the template or pattern is completely traversed by the follower during a single pass across the workpiece. The template or pattern is thus mounted in fixed relation with the workpiece and the work operation performed is a true following of the pattern or template to transfer the contour thereof to the workpiece.

The present invention differs markedly from conventional template or pattern controlled machines in that a pattern or template is employed in the present machine as a tool positioning device and the contour is then chased along the length of the work member thus permitting spiral configurations to be reproduced on the workpiece. The machine is thus one in which the work member is formed by a chasing operation similar to the chasing of threads with the template or pattern controlling the position of the tool so that the cross section of the configuration being chased on the workpiece can be controlled. Broadly, work members having any spiral configuration thereon can be turned so long as the configuration is repetitive in successive radial planes about the workpiece.

Having the foregoing in mind, a primary object of the present invention is the provision of a new and novel method of turning workpieces in a template controlled machine.

Another object is the provision of a new method of turning spiral workpieces in a template controlled machine.

A still further object is the provision of a novel template controlled turning machine and a method of operation thereof whereby right and left hand spirals can be turned on work members.

Another object of this invention is the provision of a method and apparatus for turning spiral configurations on work members which will result in much more rapid production of the work members and which permit substantially any contour to be reproduced on a work member so long as the contour is repetitive.

A still further object of this invention is the provision of a novel template controlled turning machine and a method of operation thereof which will duplicate in a turning machine work operations that previously have been done only on a shaper thereby providing for much more rapid production of the work members.

These and other objects and advantages will become more apparent upon reference to the drawings in which:

Figure 2, is a plan view looking down on top of the machine;

Figure 3 is a cross-sectional view indicated by line 3—3 on Figure 2 showing the arrangement of the slides of the turning machine that are carried with the apron along the bed;

Figure 4 is a plan section indicated by line 4—4 on Figure 1 showing the mechanism for feeding the slide arrangement in one direction;

Figure 5 is a section indicated by line 5—5 on Figure 4 showing the actuating hydraulic motor for the feed mechanism of Figure 4 and the stroke adjustment thereof;

Figure 6 is a fragmentary perspective view showing in detail the stroke adjusting mechanism for the drive of Figure 5;

Figure 7 is a sectional view through the fluid motor at the extreme right side of Figure 3 which motor serves to retract the cutting tool from the work on its idle return pass across the work;

Figure 8 is a sectional view through the special nut carried by the apron and through which the lead screw of the machine is threaded;

Figure 9 is a plan view showing the tool carrying slide positioned at an angle to the workpiece whereby re-entrant surfaces can be chased on the workpiece;

Figure 10 is a fragmentary view looking in at the back of the machine illustrating a control mechanism for limiting the travel of the carriage of the machine as it traverses the workpiece;

Figure 12 is a rather diagrammatic view showing the hydraulic circuit by means of which fluid is supplied to the servomotor that actuates the tool slide, to the fluid motor that retracts the tool from the work during the return stroke of the tool, and to the fluid motor of Figure 5 which operates to feed the slide arrangement in one direction;

Figure 13 is a simplified diagrammatic representation of a typical electrical control circuit for controlling the operation of the machine; and Figure 14 is a diagrammatic view illustrating the connections to the spindle motor whereby reverse rotation thereof is obtained and whereby a braking action is had at the time of reversing.

General arrangement

Figure 1:
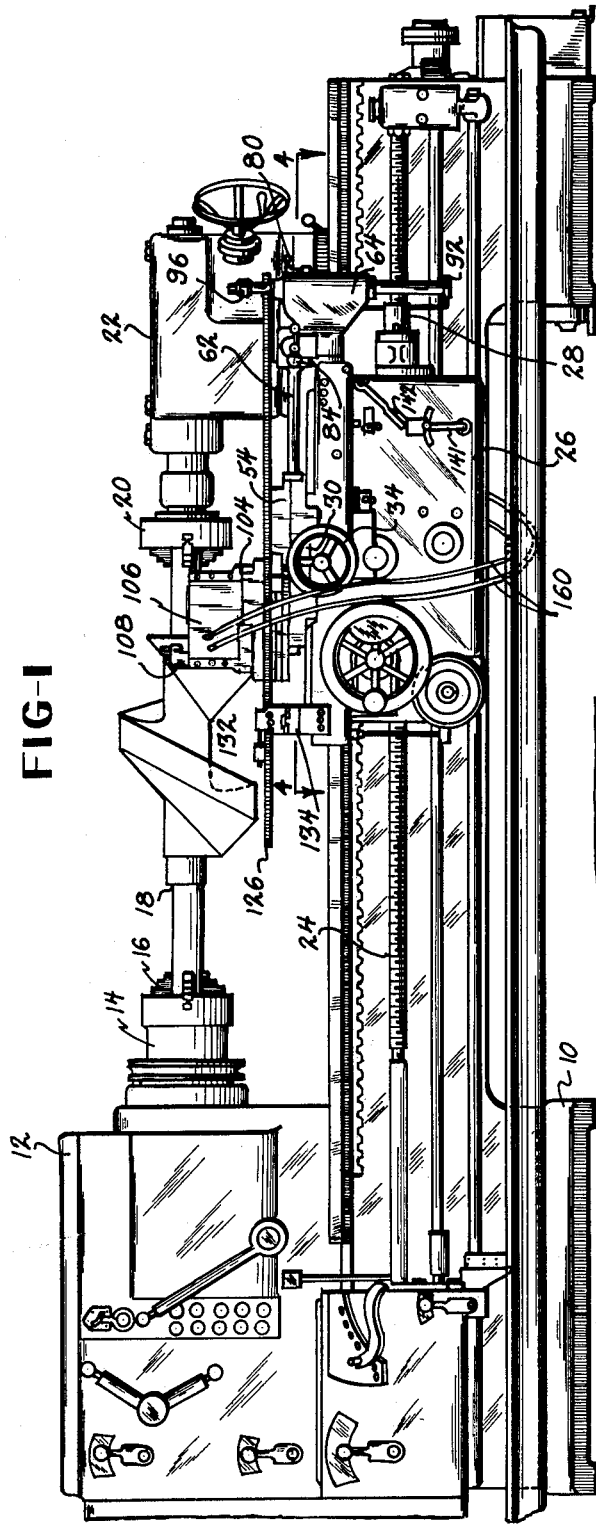
Figure 1 is a front elevational view of a contour turning machine according to my invention looking from the operator's side thereof.

The machine of the present invention basically comprises a turning machine or lathe in which a workpiece is mounted on a work axis for rotation. The machine is provided with a carriage driven longitudinally of the workpiece parallel with the work axis of the machine and the carriage comprises a plurality of superimposed slides for effecting the adjustment of a cutting tool carried by the uppermost of the slides relative to the work. According to the present invention one slide on the carriage is movable at right angles to the work axis, another is movable parallel with the work axis, and still another is movable under the control of a servomotor toward and away from the axis at any selected angle determined by a swivel support for the said slide.

A particular novel feature of the present invention resides in the positioning and support of the template that controls the servomotor pertaining to the tool slide. This template, or pattern, which ordinarily in a contour turning machine remains stationary relative to the workpiece, in the present case is mounted on the lowermost one of the slides on the carriage so as to move with the carriage of the machine. Since the template moves with the carriage of the machine there is no adjustment of the cutting tool during the traversing of the workpiece. However, adjustment of the cutting tool relative to the workpiece is accomplished at the initiation of each cutting traversal of the workpiece by adjustment of one of the slides previously mentioned relative to the carriage. In this manner the follower pertaining to the servomotor that engages the template is caused to traverse the template in increments with an increment of feed of the follower across the template occurring at the initiation of each new cutting traverse across the workpiece. Accordingly the template in the present invention corresponds more to a tool positioning device than to a conventional template structure as the term is usually employed in connection with contour turning machines. The template, however, represents a true controlling pattern inasmuch as the configuration of the template is reproduced on the workpiece in the form of a spiral.

Structural arrangement

Referring to the drawings somewhat more in detail the machine illustrated therein and which embodies the present invention comprises a lathe having bed 10 with a headstock 12 that includes a rotatable spindle 14 having chuck 16 that engages one end of the work member 18, the other end of which may be clamped in chuck 20 rotatably supported by a live center in tailstock 22.

The lathe comprises a reversible lead screw 24 adapted for being driven at a plurality of speeds in either direction by gearing of a more or less conventional nature located at the extreme left end of headstock 12 effecting a geared connection of the spindle with the lead screw and under the control of selector levers as is well known in the art to provide for a plurality of speed ratios between the spindle and lead screw.

Lead screw 24 extends through a carriage mechanism 26 and is adapted for reciprocating the carriage longitudinally of bed 10 of the lathe on the usual supporting ways.

For the purpose of connecting the carriage to the lead screw a special nut is attached to the carriage apron at 28 and which nut is illustrated in Figure 8 and will be described subsequently.

In Figures 1 and 2 it will be noted that workpiece 18 is generally of a spiral nature and that longitudinally of the workpiece the configuration of the workpiece is repetitive thereby permitting, according to the present invention, the chasing of the contour on the workpiece.

The chasing of the contour is accomplished by reciprocating the carriage longitudinally of the workpiece by lead screw 24 while positioning the tool mounted on the tool slide of the carriage on suuccessive cuts along the workpiece so as to define the contour. The mechanism for positioning the tool consists of a plurality of superimposed slides supported on the carriage. These slides will be seen in Figures 1, 2 and 3 wherein it will be observed that carriage 26 is slidably mounted on lathe bed 10 and that mounted on the carriage is a first lowermost slide 30 guided on the carriage for movement at right angles to the work axis of the machine. Lowermost slide 30 is adjustable on the carriage by a screw 32 having a hand wheel 34. Nut 31 is attached to lower slide 30 and threadingly engages screw 32. The screw 32 is slidably connected with the hand wheel as by feather key 36 and at the extreme right end of the screw is a fluid positioning motor 38 illustrated in section in Figure 7. Motor 38 comprises a cylinder portion 40 fixed to carriage 26 and a piston portion 42 therein movable in the direction of the length of the screw by a reversible supply of fluid via conduits 44 to opposite sides of the piston. The piston is mounted on and fixed to a sleeve 46 that is attached to screw 32 so that the screw can rotate within the sleeve while axial movement therein is prevented by thrust bearings 48 and 50. The length of stroke of the piston, and, therefore, the screw 32 is controllable by adjustment of collar 52. This arrangement permits the reciprocation of screw 32 and slide 30 a small amount so that at the end of a cutting stroke the slide and the tool carrying slide which is mounted thereon can be retracted a slight distance from the workpiece and the carriage can then traverse idly to its starting position. Mounted on slide 30 for reciprocation thereon parallel to the work axis is a second intermediate slide 54. This slide has a nut 56 depending therefrom that engages a screw 58 (see Figure 4) which is rotatable in bearings 60 in slide 30. Screw 58 is formed on a shaft that extends rightwardly from slide 30 through a sleeve 62 to a drive unit 64 for the shaft and screw that is mounted for movement with slide 30 and the carriage. Unit 64 comprises a vertically reciprocable rack 66 meshing with a gear 68 that drives through a oneway clutch such as Sprag coupling 70 into a shaft 72. Shaft 72 is keyed to the slidable gears 74 adapted for being selectively meshed with gears 76 that are keyed to shaft 78. A selector lever 80 provides for disengagement of gears 74 from gears 76 or for meshing of either of the gears 74 with its pertaining gear 76 which provides for reversible driving of shaft 78. One of gears 74 has an idler 82 through which it drives its pertaining gear 76 to provide for the said reverse rotation.

Shaft 78 is provided with an adjusting hand wheel 84 and the shaft is slidably keyed to a bevel gear 86 meshing with a bevel gear 88 on the end of the shaft on which screw 58 is formed.

Reference to Figure 5 will show that rack 66 is attached to ram 90 of a double acting fluid motor 92. The end of rack 66 opposite its connection with ram 90 is formed with a threaded portion 94 extending through the top of the housing of the unit and this threaded portion receives a nut 96 which can be adjusted to regulate the stroke of the rack 66.

The exact position of nut 96 on threaded portion 94 can be determined by a scale inscribed on a flat formed on one side of the threaded portion as indicated at 98 in Figure 6 while indices 100 on the nut are adapted for registration therewith to provide for fine adjustment.

It will be evident that due to the one way coupling 70, reciprocation of rack 66 by motor 92 will cause unidirectional rotation of screw 58 thus to cause slide 54 to move on its supporting slide 30 in a direction parallel with the axis of the machine.

Intermediate slide 54 forms a swivel for supporting a swivel slide and for this purpose has a pin 102 on which is mounted swivel slide 104.

Swivel slide 104 has a dovetail slide formed in its upper surface and guided thereon is a follower or tool slide 106 carrying a tool block 108 in which is mounted cutting tool 110.

The positioning of cutting slide 106 on swivel slide 104 is accomplished by a servomotor mechanism generally indicated at 112 and generally consists of a cylinder 114 attached to the tool slide, a ram 116 reciprocable in the cylinder and connected by post 118 with swivel slide 104, and a valve mechanism 120 that reversibly controls the supply of fluid to cylinder 114. Valve mechanism 120 may be of a conventional type and comprises an actuating element 122 that is in the form of a follower engaging a template 124. The follower 122 is continuously biased toward the work axis of the machine and when free to move in this direction causes fluid to be delivered to cylinder 114 in a direction to cause tool slide 106 to move toward the work axis of the machine. When the follower is arrested by the template the supply of fluid to the cylinder is cut off and the tool slide movement is also arrested. Should the follower be moved in the opposite direction the supply of fluid to the cylinder is reversed and the tool slide will retract. This type of operation is conventional in tracer controlled machine tools and a system corresponding to what is diagrammatically illustrated in the present application and is fully disclosed and described in the Waterson Patents 2,576,817 and 2,474,134 assigned to the same assignee as the instant application.

Template 124 is mounted on support bar 126 which is slidable in a block 128 attached by support plate 130 to swivel slide 104.

Turning now to Figures 1 and 2 it will be seen that the template support bar 126 extends to a clamp 132 which is in the form of a block clamped to the template bar and supported on a member 134 which is bolted to the carriage 26 so that as slide 30 moves the template support bar will also move. This type of operation is in distinction to the usual arrangement wherein the template support bar is fixedly clamped to the bed of the machine so that as the carriage moves the follower is caused to traverse the template. The support block 132 is slidably mounted on member 134 so that as slide 30 reciprocates under the influence of piston 42, the template slide bar will also move therewith and the retraction of the tool during the idle return stroke thereof will not effect the relative positions of the follower and template.

Figure 11:
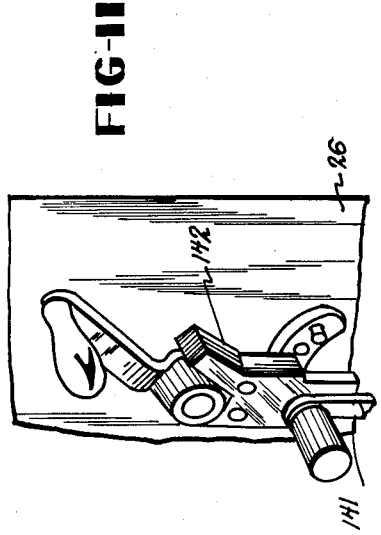
Figure 11 is a perspective view showing a locking device for locking out the half nuts in the carriage apron that normally can be employed for drivingly connecting the carriage with the lathe lead screw.

It has previously been mentioned that the carriage 26 has a special nut for engaging lead screw 24. This nut is illustrated in Figure 8 wherein it will be seen to comabout so that bolts 138 can be employed for fixing the prise an elongated member having a flange 136 therenut to a support bracket 140 attached to the carriage. This nut provides for spreading of stress over a substantial length of the lead screw whereby the carriage can be traversed lengthwise of the bed at a relatively high rate of speed and rapidly without causing undue wear of the lead screw. When the nut 28 is mounted on the machine as illustrated in the drawings, the lever 141 which is normally utilized for controlling the connection of the carriage with the lead screw 24 via half nuts in the carriage is locked in a neutral position by a clamp block 142 best illustrated in Figure 11. Should it be desired to operate the carriage in the normal manner for conventional turning operations the block 142 can be removed, the cap screws 138 removed from the flange 136, and the nut 26 can then be run down to the end of the lead screw to an idle position.

Limits of travel of the carriage are determined by a limit switch arrangement illustrated in Figure 10 and in which view, taken together with Figure 2, it will be seen that on the back of the lathe there is a rod 150 having a pair of spaced collars 152 thereon adapted for being abutted by bar 154 carried on the back of intermediate slide 54. Rod 150 has collars 156 thereon located adjacent limit switches LS1 and LS2 so a different one of limit switches is operated each time bar 154 strikes a collar 152.

The hydraulic fluid for operating the servomotor mechanism is delivered thereto via flexible conduits 160 which lead to a source of fluid pressure 162 which may comprise a pump or a pump and accumulator or any other suitable source. The pressure side of the fluid source is connected by conduit 164 with the inlet of a four-way valve 166. Valve 166 has service ports connected by conduits 168 with the conduits 170 leading from motor 92 and also with the conduits 44 leading to cylinder 40.

The four-way valve 166 has solenoid operators S1 and S2 alternately energizable for effecting reversible supply of fluid from pressure conduit 164 to the service conduits 168.

The machine is adapted for being controlled in its operation by an electric circuit which is illustrated diagrammatically in a simplified form in Figures 13 and 14. The electric circuit of Figure 13 is merely that portion of the electric circuit that pertains to the operation of the machine when it is employed for chasing spiral contours according to the present invention. It will be understood that when the machine is used for conventional turning operations, the circuit of Figure 13 would be inoperative and, instead, a conventional control circuit would be employed.

In Figure 13 the power lines are indicated at L1 and L2 and a control switch 200 is in power line L1 to control the supply of energy to the circuit.

The circuit consists of a plurality of branches extending between L1 and L2 and which branches contain the various contactors for controlling the direction of rotation of the spindle motor and the energization of the solenoids S1 and S2 of valve 166 and the controlling limit switches LS1 and LS2 that are operated at opposite ends of the travel of carriage 26.

In the first branch is a manual switch 202, a normally open blade of a relay CR2, a normally closed blade of a time controlled contactor A1, a normally closed blade of contactor SR that is energizable to cause the spindle motor to rotate in reverse direction, which is to say the spindle motor runs in a direction to cause retraction of the carriage, and the coil of a contactor SF which is energizable for causing rotation of the spindle motor in a forward direction to cause feed movement of the carriage.

Blade A1 is bypassed by a branch containing a normally open blade of contactor SF.

Extending from line L1 in bypassing relation to switch 202 is a branch containing a normally open blade of a control relay CRR and bypassing the said blade of CRR is another branch containing a normally open blade of a jog switch 204 and a normally closed blade of another control relay CRF.

Extending from the first mentioned branch at point 206 there is a branch containing a normally open blade of a relay CR3, a normally closed blade of relay A1, a normally closed blade of contactor SF, and the coil of contactor SR. Arranged in bypassing relation with the last mentioned blade of A1 is a normally open blade of contactor SR.

Leading from a point 208 is a branch containing a normally open blade of relay CRF and a timer T. Timer T controls a blade 210 located in a branch containing normally closed blade 212 of the previously mentioned jog switch, a normally open blade of relay CRF, a normally open blade of relay CRR and the coil of relay A1. A bypass connection 214 connects the side of timer T opposite line L2 with the last mentioned branch between the open blade of CRR and the timer control blade 210.

Still another branch 216 is connected from point 218 between the last mentioned blades of CRF and CRR with point 220 located between the blades of CR3 and A1 in the branch leading to contactor coil SR.

Another branch containing blade 222 of a direction responsive spindle mounted switch extends through a normally open blade of SF and the coil of relay CRF. The said blade of SF is bypassed by a normally open blade of relay CRF.

Still another branch containing blade 224 of the direction responsive spindle mounted switch extends through a normally open blade of contactor SR and the coil of relay CRR with the said blade of SR being bypassed by a normally open blade of relay CRR.

The carriage controlled limit switches LS1 and LS2 are located in another branch with switch LS1 being connected with the contacts 226 and 228 and limit switch LS2 being connected with the contacts 230 and 232 of a selector switch having one position where contact 226 is connected with contact 232 leading to the coil of relay CR2 and wherein contact 230 is connected with contact 234 leading to the coil of relay CR3.

In a second position of said selector switch connects contact 228 with contact 236 leading to the coil of CR3 and also connects contact 232 with a contact 238 leading to the coil of CR2.

Another branch leads through a normally open blade of relay CR2 and solenoid S2 of valve 166 and a final branch leads through a normally open blade of relay CR3 and solenoid S1 of valve 166.

The aforementioned contactors SF and SR control blades located in the energizing circuit for the spindle drive motor 240 as illustrated in Figure 14. Energization of contactor SF will cause forward rotation of motor 240 while energization of contactor SR will reverse the phase rotation and cause reverse rotation of the said motor. Resistors 242 in series with the motor are adapted for being bypassed by blades that are closed when relay A1 is energized.

*Operation*

In operation, a workpiece which has been forged or cast to the approximate configuration desired is mounted on the workpiece axis and clamped in chucks 16 and 20. The template that is to be used is mounted on the template support bar 128 and the servomotor controlled top slide is then adjusted to a proper position relative to the workpiece.

If a spiral workpiece of the nature indicated in Figures 1 and 2 is to be turned, the turning is accomplished by traversing the workpiece from left to right. If the spiral is of the opposite hand, the workpiece is traversed from right to left.

Assuming the workpiece is as illustrated in Figures 1 and 2, after the tool and template are initially positioned, the spindle motor is energized to cause rotation of the workpiece and of the lead screw with the lead screw turning in a direction to cause rightward movement of the carriage. This will cause the tool to follow along the workpiece cutting a spiral path therealong until the bar 154 of the carriage strikes one of the collars 152 on rod 150 causing the rod to shift and actuate one of the limit switches LS1 or LS2, in the case of rightward movement switch LS1.

When the limit switch is actuated it operates through the electric circuit of Figure 13 to cause reversing of the spindle motor which will cause the carriage to retract to its starting position.

Simultaneously with the reversing of the spindle motor, the valve 166 is actuated so as to cause piston 42 to move leftwardly in its cylinder 40 thereby to move screw 32 and therewith the superimposed slides backwardly from the workpiece so that during the reverse movement of the carriage the cutting tool is spaced from the workpiece.

The actuation of valve 166 is also accompanied by movement in one direction of rack 66 that is driven by motor 92. This movement of the rack, however, is idle movement on account of the one-way sprag coupling 70.

When the carriage has completed its return stroke, it engages and closes the other of switches LS1 and LS2, in this case switch LS2, and this again effects reversal of the spindle motor so that the workpiece and lead screw are again rotating in a direction to cause cutting of the workpiece from left to right. Valve 166 is also again actuated and this causes piston 42 to move rightwardly in cylinder 40 to return the superimposed slides back to their original position which locates the cutting tool in proper cutting relation with the work member.

Simultaneously with the said movement of piston 42, rack 66 is again actuated but in this case the movement of rack 66 is accompanied by rotation of shafts 78 and 58 which causes a rightward feeding movement of intermediate slide 54 and the swivel slide and top slide carried thereby rightwardly on lower slide 30. This feeding movement of the upper slides causes follower 122 to move relative to template 126 since the said template is fixed longitudinally relative to slide 30. If the contour of the template where it is engaged by the follower is other than parallel with the workpiece axis the said feeding movement will result in repositioning of the tool and which position the tool will hold throughout the ensuing traversal of the workpiece.

The foregoing cycle is carried out repetitively until the entire length of the template being employed is traversed. At this time about one-half the contour of the workpiece is formed thereon and the other portion is thereafter formed by using a second template.

In the drawings the setup illustrated in Figure 2 shows a template corresponding to a portion of the small diameter of the workpiece, and an inclined wall extending outwardly therefrom, and the larger diameter portion of the workpiece. The configuration of the template illustrated in Figure 22 will indicate the portions of the workpiece turned while it is mounted on the template bar.

The other portion of the workpiece which may consist of a portion of the smaller diameter portion and the concave face leading outwardly therefrom is turned in a setup as illustrated in Figure 9. Since the concave face of the workpiece cannot be reached properly by a tool when the tool slide is at right angles to the axis of the workpiece, and since this would also lead to faulty following of the template contour by the follower, the swivel slide is turned so the tool slide extends inwardly at about 45° to the axis of the workpiece.

A different template indicated at 250 is then mounted on the template bar and the bar and template positioned properly relative to the workpiece. The machine is set into operation and the same repetitive cycle as previously described will obtain thereby completing the turning of the workpiece.

It will be apparent that the workpiece can be turned utilizing a single or a plurality of templates and with the tool slide arranged as illustrated in Figure 1 or in any adjusted position as may be necessary to cause proper following of the template. In any case the same repetitive type of cycle is had with the contour to be reproduced formed on the workpiece by a plurality of traversals therealong.

The workpiece illustrated in the drawings is one which is adapted for meshing with another identical therewith but of the opposite hand and the said other workpiece can be turned in the machine of the present invention merely by reversing the operation of the machine so that the cutting of the workpiece takes place while the carriage is moving toward the left with the idle stroke of the carriage being toward the right.

This is accomplished in the present arrangement merely by moving the selector switch associated with switches LS1 and LS2 so that relay CR2 will be under the control of switch LS1 while relay CR3 will be under the control of limit switch LS2.

The electric circuit which has been generally referred to above may be treated more in detail as follows: Assuming the machine to be chasing toward the right, switch LS2 will be closed and the selector switch will be adjusted downwardly so that relay CR2 will also be closed thus closing its blades whereby solenoid S2 of valve 166 is closed and contactor SF will be energized through its blade SR, a blade of SF, and a blade of CR2.

The switch comprising the blades 222 and 224 is a switch driven by the spindle so that when the spindle is rotating in a counterclockwise direction as viewed from the right end, blade 222 is closed and blade 224 is open, and when the spindle is rotating in the opposite direction blade 224 is closed and blade 222 is open.

Also, the relationship of timer T and the blade 210 which it controls to relay A1 is such that relay A1 is deenergized when the timer is deenergized and when the timer is again energized, blade 210 will close after a predetermined time delay, say, one second, thereby again to energize relay A1.

The energization and deenergization of the timer occurs at the time of reversing the spindle motor so that during the interval that the motor is slowing down to a halt and then coming up to speed in the opposite direction relay A1 will be deenergized thus placing the resistors 242 in circuit with the motor thus limiting the surge current to a safe value during the reversal of the motor.

Under the conditions stated above with the carriage moving toward the right and the spindle motor rotating in the said counterclockwise direction, relay A1 is energized, blade 222 is closed and relay CR2 is energized.

When the carriage reaches its extreme right hand position, switch LS2 will open and switch LS1 will close causing deenergization of CR2 and energization of CR3. Closing of CR3 will energize solenoid S1 of valve 166 causing retraction of the tool from the work and the idle stroke of rack 66. Deenergization of CR2 brings about deenergization of contactor SF, and will also cause deenergization of timer T whereupon blade 210 of the timer will drop open and deenergize relay A1.

Energization of relay CR3 also brings about energization of contactor SR through the now closed blades of relay A1 and contactor SF in series with the said coil. Since the spindle motor is still coasting in said counterclockwise direction blade 222 will remain closed and relay coil CRF will remain energized. Thus, upon closing of contactor SR, the phase rotation to the spindle motor is reversed and the motor will rapidly slow down to a halt, the surge current being limited by the resistors 242 since the shunting blades pertaining thereto are open.

When the spindle motor halts and commences rotation in the opposite direction, blade 222 will open and blade 224 will close thus deenergizing relay CRF and energizing relay CRR. Energization of relay CRR will close the blades pertaining thereto and this will establish a holding circuit for relay CRR, will close an energizing circuit for timer T bringing about energization thereof and will prepare an energizing circuit for relay A1 which becomes effective upon closing of timer blade 210 after the timer has timed out.

When the timer is timed out and relay A1 is energized, the blades shunting the resistors in circuit with the spindle motor will close and full voltage will be impressed on the motor and it will run at rated speed and power.

When the carriage has traversed back to its starting point, limit switch LS2 is again closed and limit switch LS1 is opened thus deenergizing relay CR3 and energizing relay CR2. The same cycle as previously described again occurs except the spindle motor will commence to rotate in the said counterclockwise direction and the valve 166 will be shifted to cause a feed movement of the intermediate slide 54 on slide 30 and movement of piston 42 in a direction to return the tool to cutting position.

When turning a workpiece having a spiral of the opposite hand thereon, it is necessary to move from right to left during the cutting operation thus necessitating retraction of the tool at the extreme left hand position of the carriage and return thereof together with feeding movement of the slide 54 at the extreme right hand position of the carriage. This is accomplished by adjusting the selector switch in circuit with limit switches LS1 and LS2 into its upper position so that limit switch LS1 controls relay CR2 and limit switch LS2 controls relay CR3.

Since in this case it is desired to traverse the template in the opposite direction, the direction of feed of slide 54 can be reversed by availing of lever 80 pertaining to the reverse gearing connecting shaft 72 with shaft 78.

It will be appreciated that various types of spiral elements could be turned according to the present invention and including all types of threads, such as very large or special shaped threads, the only requirement being that there be provided gearing between the spindle and the lead screw to obtain the proper lead during the cutting operation. Also, other work members besides spirals of the nature illustrated or screw threads, both of which have uniform diameter and pitch, could be turned.

For example, screws such as conveyor screws could readily be finished in a machine according to the present invention and such screws, where used as expressing screws in pulp digesting apparatus and the like, could be formed with a tapered end part by turning that portion of the expressing screw by a template separate from that employed along the main body of the screw.

The arrangement of the present invention can thus be employed not only for turning straight uniform pitch spirals but by a combination of templates could turn spirals tapering from end to end or turn a combination of straight and tapered portions.

It will be evident that the incremental feeding of the template relative to the follower could take place in a direction at right angles to the work axis of the machine rather than parallel therewith if so desired, with the workpiece still being traversed from end to end in a direction parallel with the work axis. In this case, the incremental feeding of the template relative to the template follower would take place by indexing movements of screw 32 and the retraction of the tool from the surface being worked would take place by providing a suitable motor connected with threaded rod 58, in which case surfaces substantially perpendicular to the work axis could be contoured in the form of a spiral along a work member.

Also, instances may arise where it would be desired to turn a spiral contour on a generally radial work surface and this could be accomplished by arranging for the slides to traverse the workpiece radially rather than from end to end. Such a work member might comprise a heat exchanger, for example, which are often characterized by spiral flow passages for fluid.

It will also be evident that while the machine is illustrated as only cutting in one direction of travel of the carriage, cutting could be accomplished on both forward and backward movements thereof provided the lead screw could be reversed relative to the spindle without in any way changing the precise angular orientation thereof. This would probably involve some reversing gearing arrangement in the lead screw drive arranged to be shifted at the precise instant that the spindle and lead screw came to a halt. This would permit utilizing a greater percentage of the machine time than is possible in only cutting in one direction of travel of the carriage.

It will be understood that this invention is susceptible to modification in order to adapt it to different usages and conditions; and accordingly, it is desired to comprehend such modifications within this invention as may fall within the scope of the appended claims.

I claim:

1. In a machine tool; means for supporting and rotating a workpiece on a work axis, a carriage supported for movement parallel with the axis, means for driving said carriage in synchronism with the rotation of the workpiece to and fro along the work axis, a first slide on the carriage slidable thereon at right angles to the work axis, a second slide slidable on said first slide parallel to the work axis, a tool slide on the second slide movable toward and away from the work axis a servomotor connecting said tool and second slides, a control means for reversibly controlling the servomotor including a template follower carried by the tool slide, a template mounted for movement longitudinally with said carriage and transversely with said first slide and engaged by said follower thereby to position said tool slide, and means for incrementally feeding said second slide on the first slide at one end of the traversing movement of the carriage thereby to adjust the tool slide and therewith the template follower to a new position along the template.

2. In a machine tool; means for supporting and rotating a workpiece on an axis, a carriage movable parallel with the axis, means for driving the carriage to and fro along the axis in synchronism with the rotation of the workpiece, a first slide carried by the carriage movable thereon in a direction at right angles to the work axis, a second slide mounted on the first slide for movement parallel to said work axis, a tool slide on the second slide movable toward and away from the work axis a servomotor connecting said tool and second slides, control means for reversibly controlling the servomotor and including a follower carried by the tool slide, a template connected with the carriage for movement longitudinally therewith and engaged by said follower, said template being connected with said first slide for movement transversely therewith, and means connecting the first and second slides operable at one terminal of the traversing movement of the carriage for incrementally feeding the second slide on the first slide thereby to cause the said follower to take up a new position on the template.

3. In a machine tool; means for supporting and rotating a workpiece on a work axis, a carriage slidable in a direction parallel with the work axis, a first slide on said carriage slidable thereon in a direction at right angles to the work axis, a second slide on the first slide guided thereon for movement parallel to the work axis, a tool slide on the second slide movable toward and away from the work axis, a servomotor connecting the tool and second slides, a control for the servomotor carried by the tool slide and including a template follower, a template mounted for movement parallel to the work axis with the carriage engaged by the follower, a lead screw drivingly engaged with the carriage, means for driving the lead screw in synchronism with the workpiece to cause the carriage to traverse the workpiece at a predetermined uniform rate, a screw connecting the second slide with the first slide, and means for indexing said screw through a predetermined angle at one end of the traversal of the workpiece by the carriage whereby to adjust the position that the follower engages the template for positioning a tool carried by the tool slide.

4. In a machine tool; a bed, means carried by the bed including a spindle defining a work axis for supporting a workpiece for rotation on the axis, a carriage slidable along the bed parallel with said work axis, a first slide slidable on the carriage at right angles to the work axis, a second slide slidable on the first slide parallel to the said work axis, a tool slide on the second slide movable toward and away from the work axis, a servomotor connecting the tool and second slides and reversible control means therefor carried by the tool slide and including a template follower, a template mounted for movement parallel to the work axis with the carriage engaged by the follower, said template also being movable at right angles to the work axis with said first slide, a screw connecting the second slide with the first slide for adjustment of the second slide on the first slide, a lead screw rotatable in the bed drivingly engaged with the carriage and having a geared connection with the spindle, means for reversibly driving the spindle and lead screw to cause the carriage to traverse to and fro along the workpiece, and means for indexing the screw connecting the second and first slides at the initiation of the traversal of the workpiece in one direction thereby to adjust the said follower and template relatively thereby to position a tool carried by the tool slide relative to a workpiece on the work axis.

5. In a machine tool for turning spiral work members; a bed, means including a spindle defining a work axis for supporting and rotating a workpiece on the axis, a carriage slidable along the bed parallel with the work axis, a tool slide carried by the carriage guided thereon for movement at an angle to said work axis, a servomotor controlling said tool slide and control means therefor including a template follower, a template mounted on the carriage for movement therewith engaged by the follower, a lead screw engaging the carriage geared to the spindle for driving the carriage at a uniform rate along the workpiece, means for reversibly driving the spindle and lead screw, and means on the carriage operable for incrementally adjusting the tool slide longitudinally of the carriage and relative to the said template at the initiation of the traversal of the workpiece by the carriage in one direction whereby on each succeeding traversal of the workpiece in the said one direction the template follower will occupy successive adjacent positions along the template thereby to position a tool carried by the tool slide relative to the workpiece.

6. In a machine tool for turning spiral work members; a bed, a spindle carried by the bed defining a work axis, a carriage slidable along the bed parallel with the work axis, a tool slide slidably guided on the carriage for movement at an angle to the work axis, a servomotor controlling movement of the tool slide relative to the carriage including control means comprising a template follower on the tool slide, a template mounted on the carriage for movement therewith engaged by the follower, a lead screw engaging the carriage geared to the spindle, means for reversibly driving the spindle whereby a tool carried by the tool slide will traverse the workpiece in one direction for one direction of rotation of the spindle and in the opposite direction for the opposite direction of rotation of the spindle, means for retracting the tool slide from the workpiece axis at the completion of the traversal of the workpiece in one direction, means for returning the tool slide to its initial position at the end of the traversal of the workpiece in the opposite direction, and means operable prior to the initiation of the traversal of the workpiece in the said one direction for incrementally adjusting the tool slide on the carriage in a direction parallel to the work axis.

7. In a machine tool having a template controlled tool slide; a tool slide, a template follower on the tool slide, a carriage supporting the tool slide operable for traversing a workpiece from end to end, a template controlling the tool slide mounted on the carriage for movement therewith so that during traversal of a workpiece no relative movement takes place between the template and the template follower, and means operable prior to the initiation of a traversal of the workpiece for causing incremental adjustment of the tool slide longitudinally of the template on the carriage whereby on successive traversals of the workpiece the template follower will occupy successive adjacent positions along the template.

8. In a machine tool for turning spiral contours on workpieces; a bed, a rotatable spindle carried by the bed, a carriage slidable on the bed parallel with the work axis defined by the spindle, a lower slide mounted on the carriage for movement at right angles to the axis of rotation of the spindle, an intermediate slide mounted on the said lowermost slide for movement parallel to said axis, and a tool slide adjustably mounted on said intermediate slide for movement at a predetermined angle to said axis, a servomotor connected between the intermediate slide and the tool slide including control means comprising a template follower on the tool slide, a template carried by the carriage for movement therewith parallel with the work axis and also connected with the said lowermost slide for movement therewith at right angles to the said axis, a screw connecting the intermediate slide with the lower slide, a lead screw geared to the spindle and drivingly connected with the carriage, motor means for driving the spindle in both directions of rotation, means for reversing said motor means at predetermined points in the travel of the carriage, means operable at one point of reversal of the carriage for moving said lowermost slide thereon away from the said work axis, and means operable at the other point of reversal of the carriage for moving said lowermost slide inwardly toward said axis and also for indexing the said screw connecting the lower and intermediate slides through a predetermined angle whereby the position that the follower engages the template is adjusted each time the carriage commences its movement in one direction.

9. In a machine tool; a carriage, a slide on the carriage, a screw on the carriage and a nut on the slide engaged by the screw so rotation of the screw will adjust the slide on the carriage, a reciprocating fluid motor on the carriage, a driving connection between the fluid motor and the screw, said driving connection comprising a one-way clutch and reversing gearing between the clutch and the screw, and means for energizing said fluid motor in respectively opposite directions at opposite ends of the travel of said carriage.

10. In a machine tool; a carriage, a slide on the carriage, a screw on the carriage and a nut on the slide engaged by the screw so rotation of the screw will adjust the slide on the carriage, a reciprocating fluid motor on the carriage, a driving connection between the fluid motor and the screw, said driving connection comprising a one-way clutch and reversing gearing between the clutch and the screw, means for energizing said fluid motor for movement in respectively opposite directions at opposite ends of the travel of said carriage, means for adjusting the stroke of said fluid motor thereby to adjust the amount of rotation imparted to said screw thereby, there being another slide interposed between the first mentioned slide and carriage movable on the carriage at an angle to the direction of movement of the first mentioned slide, and a slidable non-rotatable connection in the driving connection between the fluid motor and the screw to permit said other slide to move without changing the adjusted position of the first mentioned slide.

References Cited in the file of this patent

UNITED STATES PATENTS

| | | |
|---|---|---|
| 679,238 | Monahan | July 23, 1901 |
| 796,171 | Ambrose | Aug. 1, 1905 |
| 1,290,550 | Hardinge | Jan. 7, 1919 |
| 1,367,459 | Carson | Feb. 1, 1921 |
| 1,693,781 | Hanson | Dec. 4, 1928 |
| 2,581,060 | Wold | Jan. 1, 1952 |
| 2,692,966 | Hommel | Oct. 26, 1954 |

FOREIGN PATENTS

| | | |
|---|---|---|
| 1,132,553 | France | Nov. 5, 1956 |